United States Patent
Derderian et al.

[11] 3,949,490
[45] Apr. 13, 1976

[54] SIMULATOR INCLUDING IMPROVED HOLOGRAPHIC HEADS UP DISPLAY SYSTEM

[75] Inventors: George Derderian, Maitland; Windell Neil Mohon, Winter Park, both of Fla.

[73] Assignee: The United States of America as represented by the Secretary of the Navy, Washington, D.C.

[22] Filed: Oct. 25, 1974

[21] Appl. No.: 518,000

[52] U.S. Cl. .................................. 35/12 N
[51] Int. Cl.² ............................. G09B 9/08
[58] Field of Search ...... 35/11 R, 11 A, 12 F, 12 N, 35/25, 10.2; 40/33, 34, 130 A; 178/6.8, DIG. 35; 350/3.5, 159

[56] References Cited
UNITED STATES PATENTS

| | | | |
|---|---|---|---|
| 3,281,965 | 11/1966 | Irwin | 35/12 N |
| 3,479,750 | 11/1969 | Swanson | 35/11 R |
| 3,675,344 | 7/1972 | Williams | 35/12 N |
| 3,694,558 | 9/1972 | Eisenberg et al. | 35/12 N X |
| 3,699,244 | 10/1972 | Cohen et al. | 35/12 N X |
| 3,732,793 | 5/1973 | Tague | 350/159 |
| 3,737,212 | 6/1973 | Antonson et al. | 350/3.5 X |

*Primary Examiner*—Richard C. Pinkham
*Assistant Examiner*—Vance Y. Hum
*Attorney, Agent, or Firm*—Richard S. Sciascia; John W. Pease

[57] ABSTRACT

A simulator including an improved holographic heads up display system in which the projection of images, via a plurality of slide projectors, through several light ray channels or paths, are controlled by polarizer light valves, associated one with each respective channel, and the output or outputs of the channels dependent upon the on-off conditions of the several light valves, is passed through a holographic lens as a window to the eye of an observer. Apparatus is also provided to maintain a desired light level intensity at said window by coordinated adjustment of the light valves. A further aspect of the invention contemplates the provision of vehicular control mechanism connected to recording charts on which a prerecording of correct response to a programmed display has been made on each chart to compare the actual trainee controls movement with the proper movement for the exercise.

4 Claims, 4 Drawing Figures

SIMULATOR INCLUDING IMPROVED HOLOGRAPHIC HEADS UP DISPLAY SYSTEM

BACKGROUND OF THE INVENTION

The invention relates to the fields of simulation and system optics and is particularly useful in training personnel for vehicular control reaction to a series of image displays depicting problem conditions.

In the prior art, devices incorporating a heads up display system have utilized either screen projection means or a beam splitter to bring the image to the heads up viewing position of the observer or trainee. Problems related to the prior art devices include the element of time in switching from one image to another, the elements of background interference, low contrast, variations in light intensity levels and the effect on eye muscles of having to react to apparent variation in image distance.

In the present invention the provision of adjustable polarized light valves for controlling light rays projected through a holographic lens as a window to the eye of an observer eliminates the disadvantages mentioned above. Thus, in the polarized light valve concept since the image light source is on all the time, the light valve provides an instant-on feature. There is no delay time required for bulb warm up. The light valve concept provides a perfectly black background from any and all channels where the valve is in closed position. This feature is critical since any stray light impinging on a holograhic lens will be directed into the trainee's eyes as a background flare, thereby reducing image contrast and decreasing trainee's eye pupil size. This decreases his ability to recognize targets. Image enhancement is thus obtained. The invention further provides via the adjustable polarized light valves and a light level metering means the ability to control light level during image change on any one or more channels and thus avoid muscle strain and time lag to accommodate the eye to a different light level. The polarized light valves also enable a selected variation of light level to depict conditions of day, night, fog, shade, etc. A further and important feature of the invention is the ability to introduce a plurality of more than two input channels from image sources and to maintain all images at infinity such that again the eye muscles need not be employed to accommodate to close and distant objects. The eye muscles thus remain relaxed. In a further aspect the invention provides trace recording means coordinated with the programmed light channel means to provide a record of trainee performance trace in relation to optimum performance trace on the same record.

SUMMARY OF THE INVENTION

The invention comprises in a simulator an improved multichannel heads up display in which a plurality of multislide projectors and programming means therefor direct image rays through a holographic lens forming a window to the eye of an observer, and in which in each image light ray path there is provided an adjustable polarized light valve and means for adjusting each valve to off, on or adjusted intermediate light passage. The simulator further comprises prescored recording means, time coordinated with the projector means and connected to the trainee controls to record his control action to a given displayed situation in comparison to an optimum control movement for the same presentation.

DESCRIPTION OF THE PREFERRED EMBODIMENT

Figure 1:
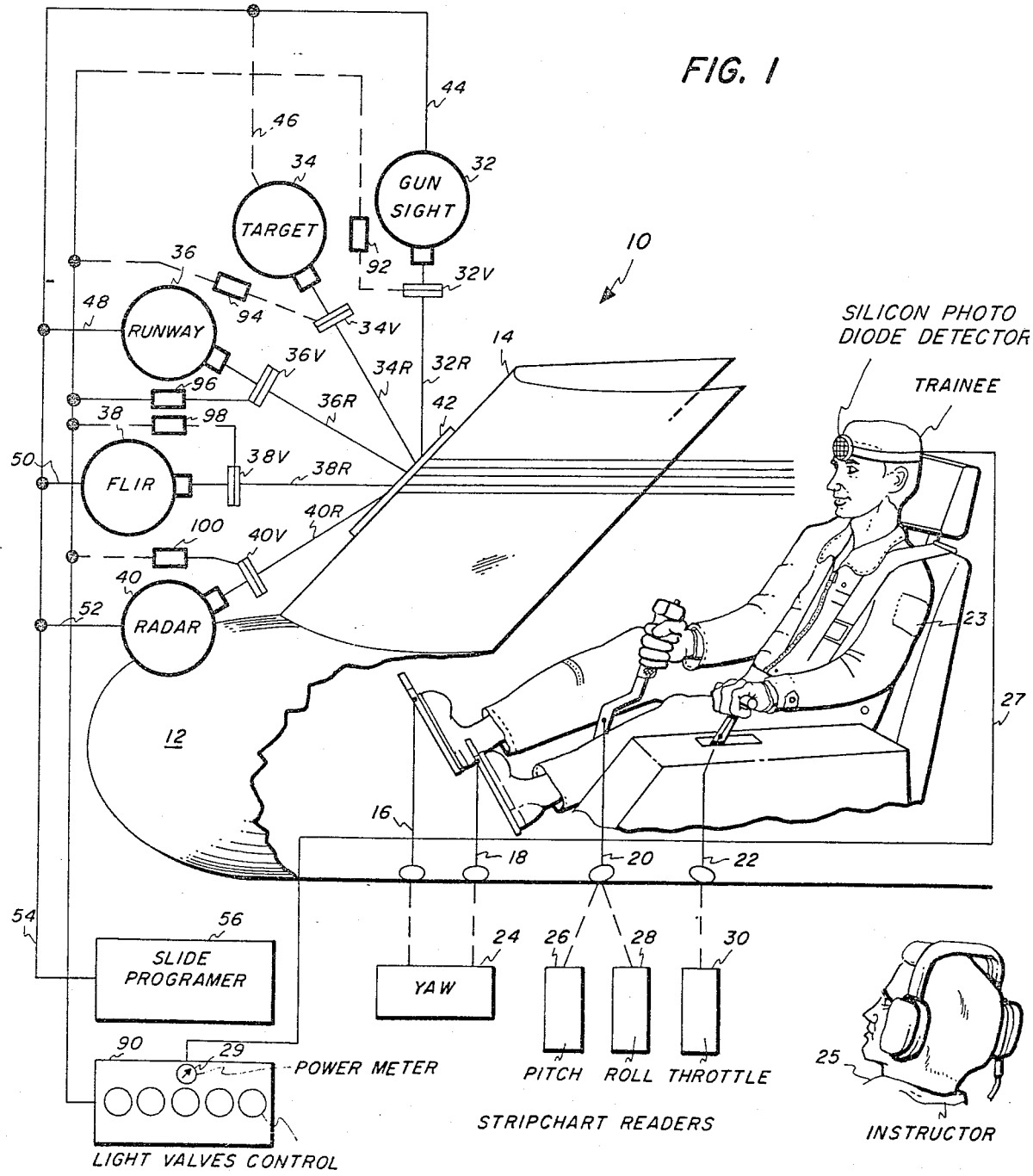
FIG. 1 is a schematic view of an operational flight trainer incorporating the invention.

In FIG. 1 is shown schematically one preferred embodiment of the invention as applied to an operational flight simulator for a selected aircraft. The trainer 10 includes the usual cockpit 12, windshield 14, rudder controls 16 – 18, stick control 20, and throttle control 22, which are controlled by the trainee 23. In accordance with one aspect of the invention, connected to the above controls as indicated by dotted lines are yaw, pitch, roll and throttle recording charts indicated respectively at 24, 26, 28 and 30. The connection therebetween and operation will be shown and described hereinafter in relation to FIG. 4.

Also, according to the invention and as shown in FIG. 1, a plurality of slide projectors 32, 34, 36, 38, 40 are used as light ray image generators for selected subjects such as gunsight, target, runway, FLIR (Forward Looking Infrared) and radar. The respective rays indicated as 32R, 34R, 36R, 38R and 40R are directed through associated light valves 32V, 34V, 36V, 38V and 40V and a common holographic lens 42 to form a window to the eye of the trainee 23.

Figure 3:
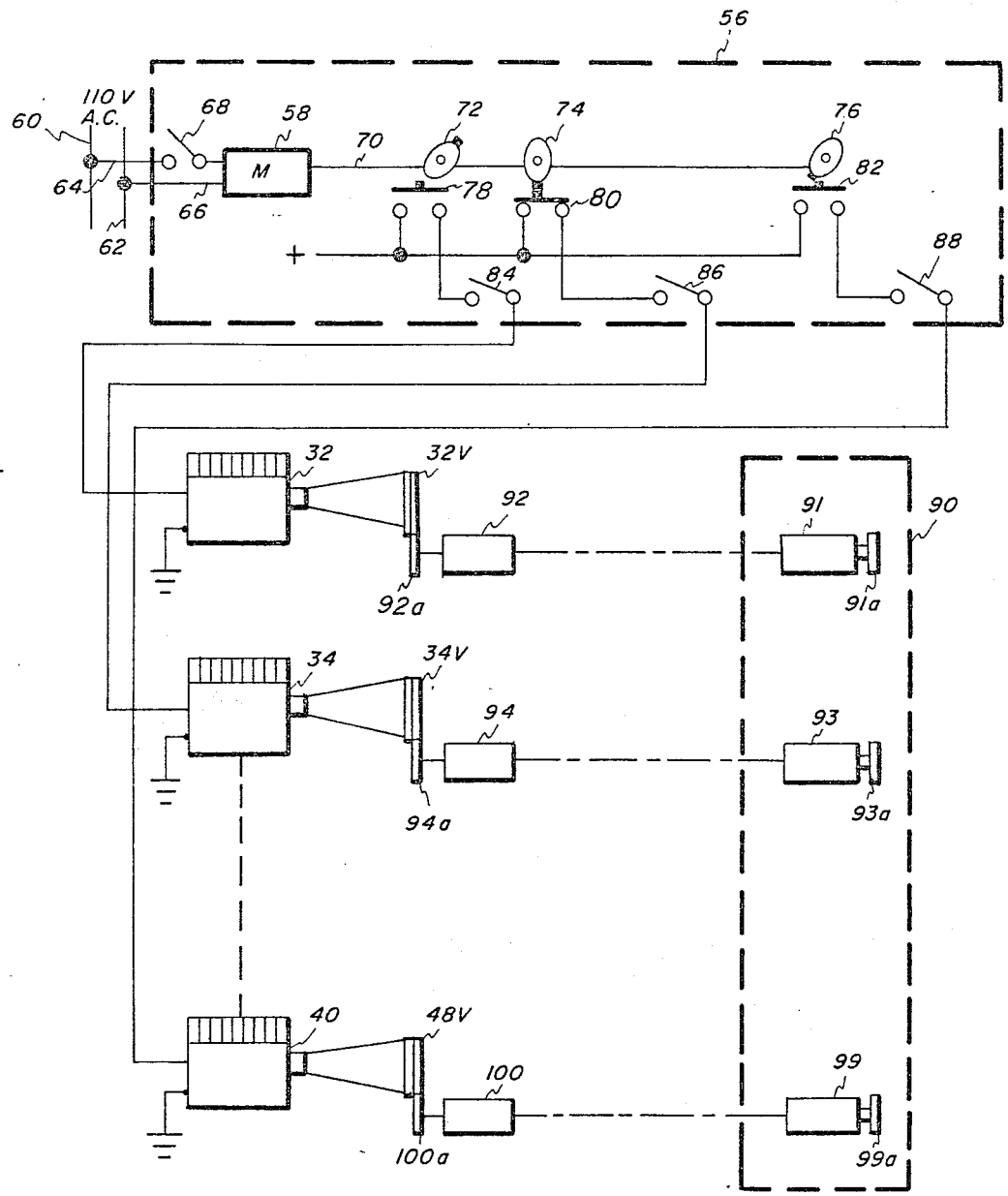
FIG. 3 is a diagrammatic view of the projector and light valve means of FIG. 1 and the controls for each.

As shown in FIG. 1, the slide projectors 32, 34, 36, 38 and 40 are connected to a slide programmer 56 via respective lines 44, 46, 48, 50 and 52 which are bundled in cable 54. Referring to FIG. 3, the programmer 56 may comprise any suitable circuit means for selecting slides. In FIG. 3 the programmer selected uses a motor 58 fed from source lines 60 and 62 via input lines 64 and 66 and switch 68. The motor 58 is mechanically connected by a drive shaft 70 to rotate cam members 72, 74 and 76 for actuating selected slides in the respective projectors indicated at 32, 34 and 40. Cam members 72, 74 and 76 actuate the respective switches 78, 80 and 82 to index the respective projectors 32, 34 and 40. Additional switchs 84, 86 and 88 are placed in series with the respective switches 78, 80 and 82 to keep a selected projector inoperative or to place it in condition for indexed programming as required by the training exercise. FIG. 1 has shown five projectors. FIG. 3 has shown only three with dotted line connection to maintain simplicity of the drawing.

As shown in FIG. 1, each of the light valves is controllable by a servo system from a control box 90 via servos 92, 94, 96, 98 and 100, with corresponding servos in the control box 90 and knobs for adjusting the servos. FIG. 3 best shows the servo motor drive for adjusting the light valves 32V, 34V and 40V corresponding to the projectors 32, 34 and 40. Thus, the light valve control box 90 is provided with servos 91, 93 and 99 connected to companion servos 92, 94 and 100. Servo 91 has a control means indicated by knob 91a by which it is adjusted and the companion servo 92 has a drive wheel 92a which rotates the associated light valve 32V. Likewise servos 93 and 99 and companion servos 94 and 100 have respectively control means indicated by knobs 93a and 99a and drive wheels 94a and 100a for the respective light valves 34V and 40V.

Figure 2:
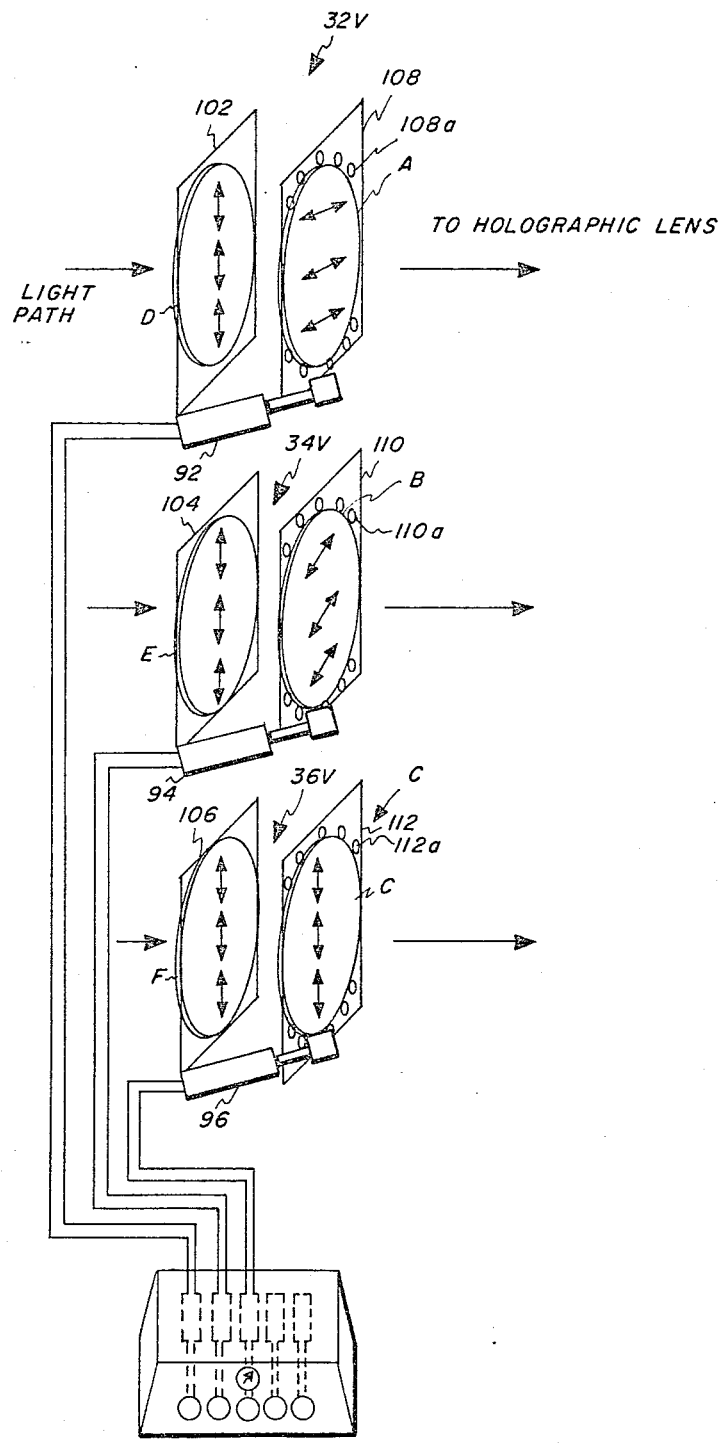
FIG. 2 is an enlarged schematic of the light valves of FIG. 1 and their operating controls.

Structure and operation of the light valves is best seen in FIG. 2 showing three of the valves, 32V, 34V and 36V and associated servos, by way of example. The valves comprise fixed polarized elements D, E and F and rotatable polarized elements A, B and C. As indicated by the double headed polarization arrows, elements D, E and F which are fixed elements held in supports 102, 104 and 106, are vertically polarized. The elements A, B and C are rotatably mounted in supports 108, 110 and 112 respectively on the bearing race elements 108a, 110a and 112a indicated and are activated, i.e., rotated, by servo motors 92, 94 and 96 respectively to the desired light valve position. In valve 32V the elements D and A are 90° removed and hence are closed, passing no image light to the holographic lens. Elements E and B of valve 34V are 45° removed and the valve is thus about one-half open. Valve 36V indicates the completely open condition, the polarization of elements F and C being in the same, i.e., vertical, direction as indicated by the double headed arrows thereon. Light from the light source, in the example shown the slide projectors, is passed as indicated by the light path arrows, through the first polarizer elements and becomes linearly polarized. The light ray then passes to the second rotatable linear polarizer and is blocked or varied in intensity of light ray passed depending upon the rotatable position of the second polarizer with respect to the first. The light then passes to the holographic lens 42 indicated in FIG. 1. The complete theory of the functioning of the two crossed polarizers is explained on pages 490 to 495 of "Fundamentals of Optics" by F. A. Jenkins and H. E. White of University of California, published by McGraw Hill Book Co., 1957. In order that the instructor 25 may coordinate the adjustment of the light valves to maintain fixed light intensity from the combined rays, a detector, such as a silicon photodiode detector, is fixed to the head of the trainee and its current is passed on line 27 to light meter 29 which reads the power in watts per square centimeter.

Figure 4:
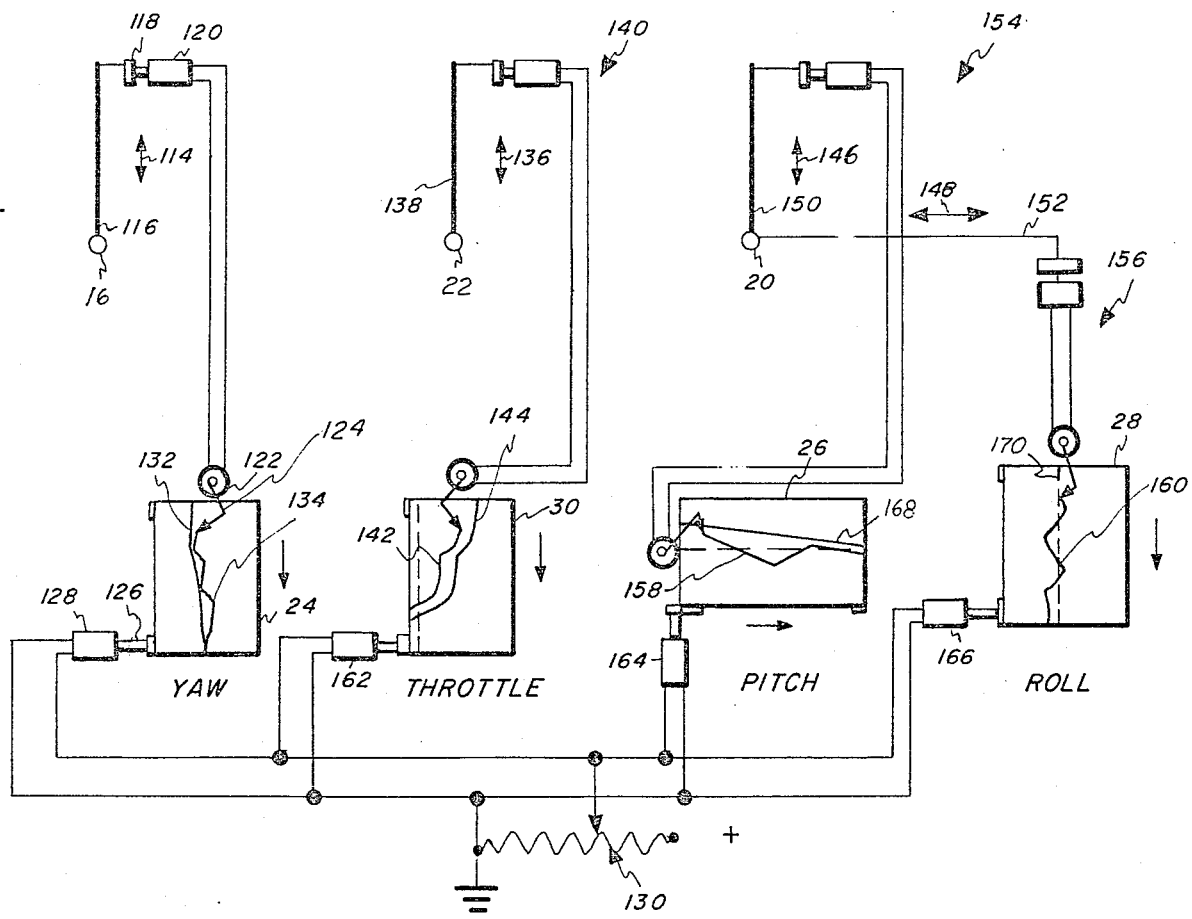
FIG. 4 is a schematic view of control means in the flight trainer of FIG. 1 and the mechanical and electric circuit means for controlling the same.

Referring to FIGS. 1 and 4, thereof is shown provided recording charts 24, 26, 28 and 30 for the functions of yaw, pitch, roll and throttle. FIG. 1 shows the rudder control pedals 16 and 18 connected to the yaw chart 24, the joy stick 20 connected to the pitch and roll charts 26 and 28, and the throttle 22 connected to the throttle chart 30. In FIG. 4, one suitable system is shown for recording on the charts the movement of the four control means. The rudder movement is indicated by the arrow 114 showing the movement of a rudder attached arm 116 which is connected to rotate knob 118 which controls servo motors 120 and 122 which in turn moves marker 124 across the moving chart 24. Chart 24 is driven by drive roller 126 of a motor 128 which is adjusted in speed and driven from adjustable potentiometer 130 connected to a power source indicated. The chart 24 is premarked with a line 132 indicating where the marking pen 124 should mark if the trainee operated the rudder pedals correctly for the particular exercise viewed on the holographic lens 42. Line 134 indicates the actual tracing made by the trainee. A comparison of the two enables the instructor to advise the trainee with respect to his performance. The same type arrangements are provided for throttle, pitch and roll. Thus, the throttle chart is marked by movement of a link 138 which actuates a servo system and marker indicated generally at 140 and making a mark 142 on the chart for comparison to a premarking 144. The joy stick 20 controlling pitch and roll has two movements indicated at arrows 146 and 148, and through linkages 150 and 152 actuates the two servo and marker systems shown and indicated generally at 154 and 156 to provide the trainee traces 158 and 160 to be compared with the proper premarking for the exercise indicated at 168 and 170. The roll charts for throttle, pitch and roll, respectively 30, 26 and 28 are driven by respective motors 162, 164 and 166 from the common potentiometer 130 as indicated.

It should be understood that in practice a more sophisticated system might be desirable and used wherein the control movements address a computer, which solves formulas associated with the particular apparatus being simulated, which then provides an output to activate the servo systems to move the markers for marking the recording charts. Also, quite obviously the invention is not limited to an operational flight trainer simulation, as any number of vehicles and devices can be simulated in the manner described.

What is claimed is:

1. A simulator including an improved multichannel heads up display for viewing from an observer point comprising
   a. a multichannel holograhic lens means,
   b. a plurality of multi-slide projectors for passing a plurality of images on light ray paths through said holographic lens means to an observer point,
   c. adjustable polarizing light ray valves positioned one in each light ray path, each including one rotatably adjustable polarizing element means for passing, interrupting and varying in light intensity its associated light ray,
   d. drive means for selectively manually adjusting each of said rotatable element means of said light ray valves to selectively present to said viewer at simulated infinity position and at desired light level one or more of said light ray images, and
   e. programming means for exposing selected slides of said projectors as desired in a selected training exercise.

2. Apparatus according to claim 1, including
   a. light detector means positioned adjacent said observer point to receive said light ray or rays and to transmit a voltage corresponding to received light intensity, and
   b. power meter means connected to said light detector means for indicating the received light intensity level so that said level may be maintained at a desired value by adjusting said light ray valves via said drive means as necessary to maintain said power meter means at a desired constant reading corresponding to the desired light intensity level.

3. Apparatus according to claim 2, including
   a. a plurality of vehicular controls to be actuated by a trainee in response to a series of presentations on said image display,
   b. a plurality of recording chart means actuatable in coordination with the programmed actuation of said slide display and connected to said vehicular controls to record the response of said trainee to the presented display, and
   c. each of said chart means being premarked with a correct trace of control movement for a particular series of image displays for comparison with the actual trace on said charts made by the trainee for the same series of image displays.

4. Apparatus according to claim 1, including
a. a plurality of vehicular controls to be actuated by a trainee in response to a series of presentations on said image display,
b. a plurality of recording chart means actuatable in coordination with the programmed actuation of said slide display and connected to said vehicular controls to record the response of said trainee to the presented display, and
c. each of said chart means being premarked with a correct trace of control movement for a particular series of image displays for comparison with the actual trace on said charts made by the trainee for the same series of image displays.

* * * * *